H. HARRIS.

Extracting Tubular Casing from Oil-Wells.

No. 136,992. Patented March 18, 1873.

Witnesses
D. P. Cowl
Jno. D. Patten

Inventor.
Hart Harris,
by his atty.
Wm. H. Rowe

UNITED STATES PATENT OFFICE.

HART HARRIS, OF TIDIOUTE, PENNSYLVANIA.

IMPROVEMENT IN EXTRACTING TUBULAR CASINGS FROM OIL-WELLS.

Specification forming part of Letters Patent No. 136,992, dated March 18, 1873.

*To all whom it may concern:*

Be it known that I, HART HARRIS, of Tidioute, in the county of Warren and State of Pennsylvania, have invented an Improvement in the Art of Extracting Tubular Casing from Oil-Wells and Artesian Wells, of which the following is a specification:

My invention relates to an improved method and a special tool for the withdrawal of the "casing" used in oil-wells when it is desired to abandon the well, or for the purpose of repairs.

The metallic tubing or casing is employed to prevent the walls of the well from caving in at places where sand or other crumbling substance is penetrated, and is usually sunk a sufficient distance to be below fresh water. This casing is packed at its lower end so as to exclude the fresh water from the interior of the casing, so that the oil will not be displaced or intercepted by the flow of water. The sand and sediment of the water frequently mixed with lime settles above the packing and forms a cement or obstruction that causes great difficulty in attempting to remove the casing from the bore of the well. It is often necessary to remove the casing for repairs, and also from abandoned wells, so that it can be used again at a new place. The methods heretofore used and the devices employed for this purpose have been defective, some of them attempting to remove the casing simply by means of gripers, and others by cutting off the pipe above the obstruction.

The object of my invention is to save the entire length of the casing and at the same time remove it in a simple and expeditious manner. The improvement consists, first, in a novel method of removing the casing by splitting or cutting the casing longitudinally a sufficient distance to form an opening through which the sediment from the water around the outside of the casing can pass into the casing and fall to the bottom of the well; or by permitting the pipe or casing to collapse and become smaller, so that it can be more readily withdrawn, as hereinafter described; secondly, in forming the body of a splitting-tool with a longitudinal slot having an inclined bottom, in combination with a block that carries a cutter or its equivalent, and rests upon and is fed outwardly by the inclined bottom of the slot, as hereinafter described; thirdly, in securing the cutter-block in the longitudinal slot of the body of the implement by means of set-screws that take into grooves in the side of the block, and permit it to move freely up and down the slot, but prevent its displacement without first removing the set-screws, as hereinafter described.

Figure 1:
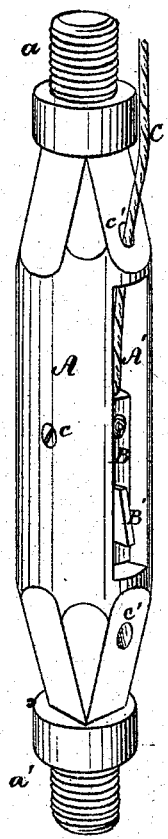
Figure 2:
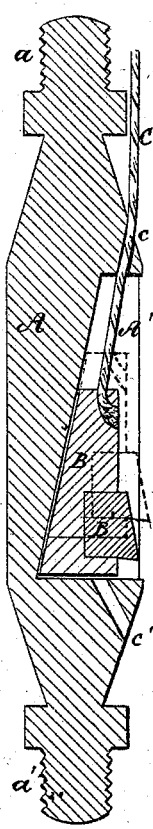
Figure 3:
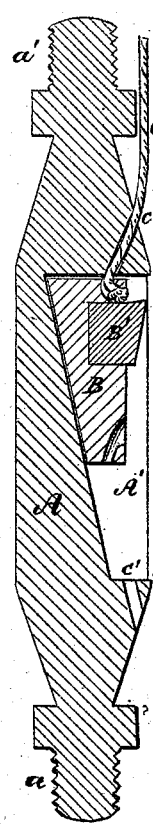
Figure 4:
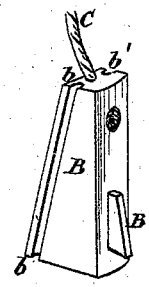
Figure 5:
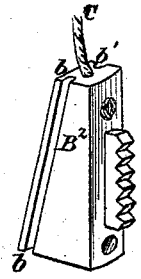

In the accompanying drawing, Figure 1 is a perspective view of my improved device when the cutter-block is in position for the implement to be lowered into the well, and it is desired to cut downwardly. Fig. 2 is a central longitudinal section of the same, showing the cutter-block, by dotted lines, partially raised in the groove, so that the cutter slightly protrudes; Fig. 3, a central longitudinal section of the device when the cutter-block is in position for the implement to be lowered into the well and it is desired to cut upwardly; Fig. 4, a perspective view of the cutter-block detached; Fig. 5, a similar view of the block when provided with a grab-piece.

The body A of the implement is of any suitable size and shape, and is provided at either end with a threaded stud, $a$ $a'$, or other suitable means for securing the implement to the jars and other connections used in drilling wells of this description. A longitudinal slot, A', in the body A, is inclined at the bottom, and a cutter-block, B, correspondingly inclined at the bottom, fits snugly between the walls of the slot A', so as to move freely up and down therein, and has a cutter or knife, B', secured to it in a suitable manner. The block B has a groove, $b$ $b'$, formed in each of its sides, parallel with the inclined bottom, and is held in place by set-screws $c$ that pass through the body A and walls of the slot, and project into the grooves $b$ $b'$ a short distance. As the grooves $b$ $b'$ are parallel with the bottom of the block B, and also with the bottom of the slot A', it is obvious that the block is permitted to move freely up and down in the slot, but is prevented from being withdrawn without first unscrewing the set-screws. A cord, C, is secured to the end of the block B, and, passing through the holes $c'$, communicates with the top of the well, so that the operator may raise the block in the slot by simply drawing upon the cord. When the block is raised in the slot by the cord, shown in Fig.

2, the cutter is caused by the inclined bottom of the groove to protrude from the body a distance proportionate to the distance moved by the cutter-block and to the inclination of the bottom of the slot.

When it is desired to split downwardly, the implement is secured to the jar and well tools, with the larger end of the cutter-block down, as shown in Figs. 1 and 2. The feeding-cord is kept slack, until the desired point is reached and then drawn up, so that the cutter-block is raised in the slot and the cutter caused to protrude and come in contact with the casing. The implement is then lowered until the jars have about six inches stroke, and the well-tools are hitched to the walking-beam and driven by engine and temper-screw to the degree required. When it is desired to split upwardly, reverse the implement, as shown in Fig. 3, and keep the feed-cord taut until the desired point is reached; then slack up on the feed-cord until the cutter has taken hold of the casing, and proceed to jar upwardly the distance required. The cutter is loosened by driving lightly down on the jars, and the feed-cord pulled taut until the cutter-block is found to be in its place. The tools are then raised, keeping the feed-cord taut, until they are withdrawn from the casing.

The implement can be used as a grab for withdrawing the casing after it has been split by simply substituting the block B², provided with serrations or teeth, as shown in Fig. 5, instead of the knife, in which case the implement will be lowered with the deep end of the slot up, as shown in Fig. 3, and the operation performed in a manner similar to that of jarring up.

Many modifications and additions could be made to the device herein described without departing from the spirit of the invention; and I do not limit myself to the particular form and construction of the means herein described.

I claim as new and desire to secure by Letters Patent—

1. The method of removing the casing from oil and artesian wells by splitting the casing longitudinally a suitable distance to enable it to be withdrawn, substantially as and for the purpose specified.

2. The combination of the body formed with a longitudinal slot having an inclined bottom, and a block that carries a cutter or its equivalent that rests upon and is fed outwardly by the inclined bottom of the slot, substantially as and for the purpose specified.

3. The combination of the body of the implement formed with a longitudinal slot, a cutter-block provided with an inclined groove on its side, and a set-screw that takes into the groove and holds the block in place, substantially as and for the purpose described.

In testimony whereof I have hereunto subscribed my name.

HART HARRIS.

Witnesses:
  K. J. CARSON,
  A. P. SAXER.